Aug. 17, 1954
W. F. VOGEL
2,686,473
MISSILE
Filed May 11, 1949
2 Sheets-Sheet 1
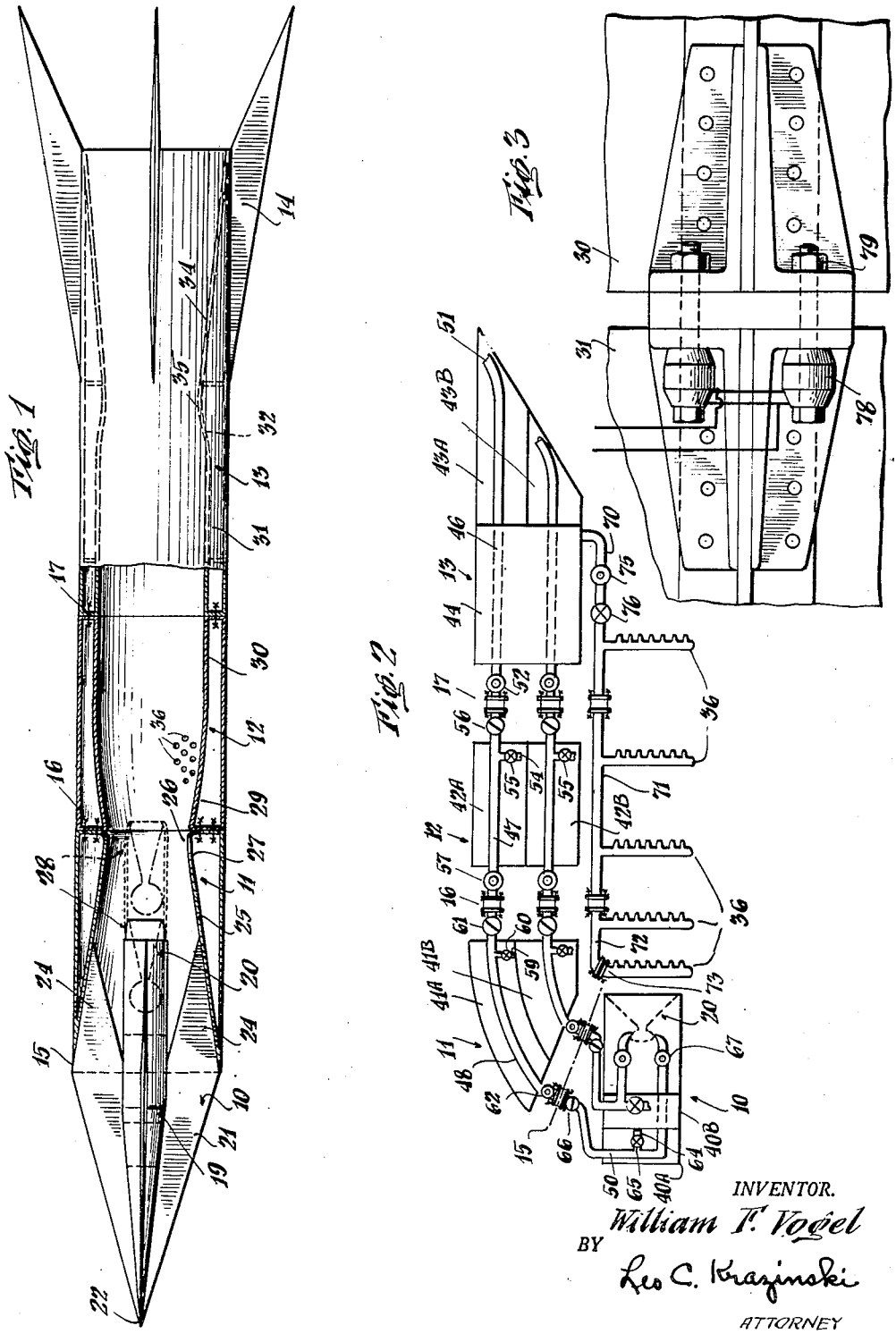
INVENTOR.
William F. Vogel
BY
Leo C. Krazinski
ATTORNEY Aug. 17, 1954     W. F. VOGEL     2,686,473
MISSILE
Filed May 11, 1949     2 Sheets-Sheet 2
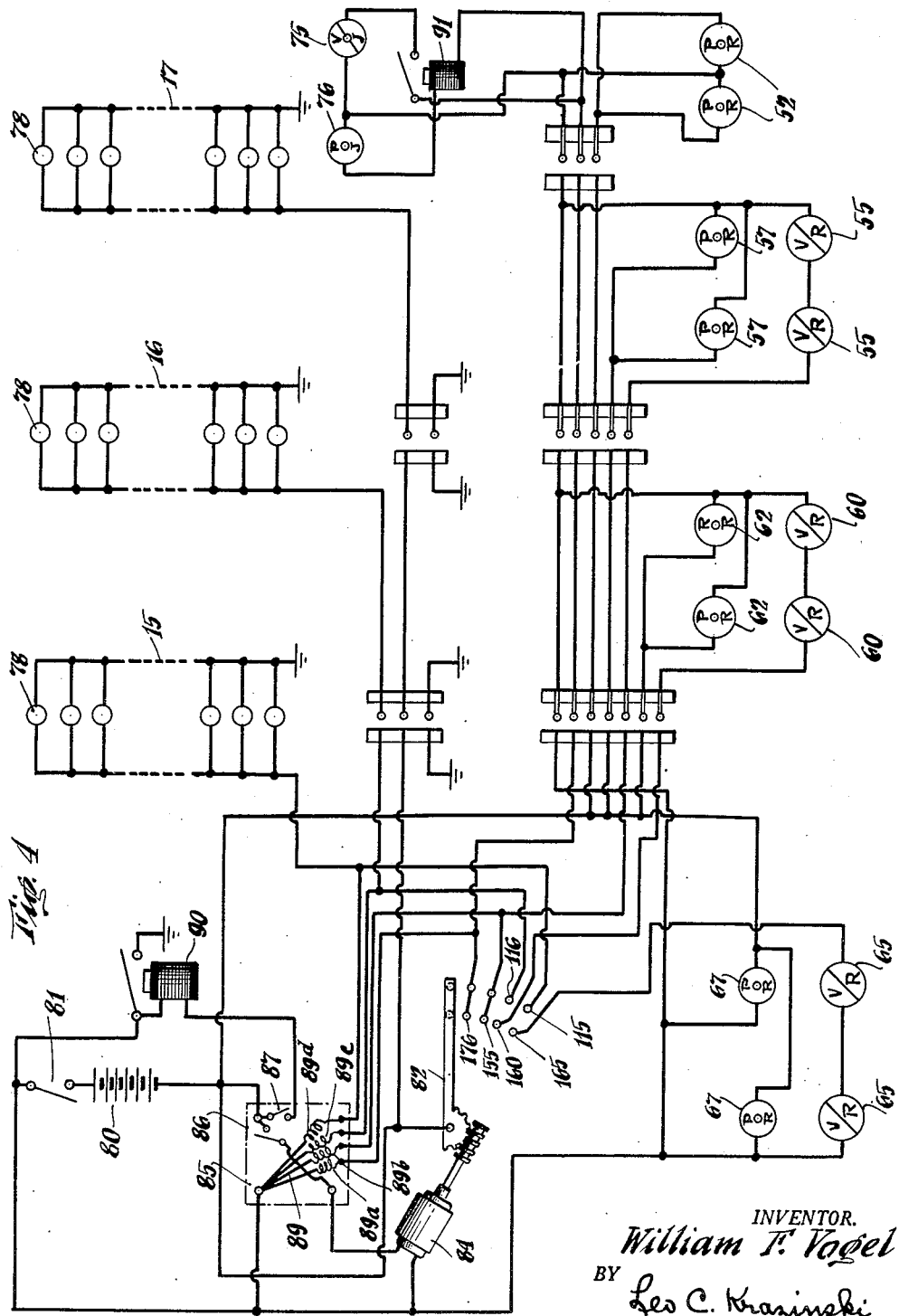
INVENTOR.
William F. Vogel
BY Leo C. Krazinski
ATTORNEY Patented Aug. 17, 1954

2,686,473

UNITED STATES PATENT OFFICE 2,686,473

MISSILE

William F. Vogel, Cross River, N. Y.

Application May 11, 1949, Serial No. 93,502

25 Claims. (Cl. 102—49)

The present invention relates to missiles, particularly to long range missiles capable of operation beyond the limits of the earth's atmosphere.

The present invention aims to provide a multiple-stage missile of the foregoing type which is highly efficient in operation and yet is relatively simple and economical in construction.

Accordingly, an object of the present invention is to provide a missile in which the combined desirable characteristics of a ducted rocket and a ram-jet are utilized.

Another object is to provide a novel arrangement for discarding fuel and propellant tank structure and accessories during flight upon becoming superfluous to thereby decrease the remaining mass of the missile and permit increased acceleration thereof during succeeding stages of operation.

Another object is to provide a multiple-stage missile wherein the main rocket power plant is so located that it is retained intact throughout the entire flight thereby eliminating the necessity of duplication of rocket engines and accessories.

Another object is to provide a missile having an improved ram-jet combustion chamber.

Another object is to provide a multiple-stage missile having an improved fuel and/or propellent supply system.

A further object is to provide a device wherein the operating characteristics of the ducted rocket and/or ram-jet components may be varied within limits in order to accommodate a variation in Mach number of air entering the duct of the missile.

Other and further objects will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects may be accomplished by providing a missile having an axial duct, a rocket engine, adjacent the forward end of the duct, and ram-jet heads or orifices for injecting combustible fuel into the duct rearwardly of the engine. The duct is formed with a ram-jet combustion chamber of special design whereby the ducted rocket engine and ram-jet operating characteristics are improved both when operating alone or in conjunction with each other. Provision is made for moving the rocket engine and/or its nacelle casing axially within the duct to vary the operating characteristics of the ram-jet or duct. The missile is constructed of lengthwise connected sections which may be separated under the control of timing means to discard superfluous sections when desired. Each section comprises one or more tanks for ram-jet fuel or rocket propellant, and a novel system for supplying the fuel and propellant to the ram-jet and rocket engine, respectively, includes pumps and valves under the control of the timing means which are so arranged to reduce the number of accessories and elements related thereto to a minimum.

A preferred embodiment of the invention has been chosen for purposes of illustration and description and is shown in the accompanying drawing, forming a part of the specification, wherein:

Figure 1 is a longitudinal sectional view illustrating the general structure of a missile in accordance with the invention, details of the rocket engine, ram-jet, fuel and propellant supply system and control means not being shown.

Figure 2 is a schematic view of the rocket engine propellent and ram-jet fuel supply system.

Figure 3 is an enlarged fragmentary elevational view illustrating a device for effecting separation of sections of the missile.

Figure 4 is a wiring diagram illustrating elements for controlling the fuel and propellant supply systems and the missile section separating devices.

Referring to the drawings and more particularly to Figure 1 thereof, there is shown a missile generally comprising a forebody, head or projectile section 10, a pair of body sections 11 and 12, and a tail section 13 formed with fins 14. These sections are respectively connected by means at 15, 16, and 17 adapted to be rendered structurally ineffective, each at a predetermined instant, to cause separation of the affected sections, as will be described hereinafter.

The head section 10 comprises an axially extending rocket nacelle 19 having a rocket engine 20 at the tail end thereof and having various accessories mounted therein, and a plurality of circumferentially spaced airfoil fins 21 converging at the forward end to form a projectile point 22 and having substantially triangular portions 24 at their tail end, the purpose of which will become apparent from the description to follow. The rocket nacelle 19 also contains the warhead or cargo space, guidance instrumentation, and last-stage tanks for rocket propellant.

The body and tail sections 11, 12, and 13 have outer walls or skins shaped as a surface of revolution and streamlined in accordance with transonic and supersonic aerodynamic criteria in order to obtain a low drag coefficient, and have tubular inner walls or skins cooperating to provide a duct extending from the front of the body section 11 to the rear of the tail section 13. Tanks for rocket propellant and/or ram-jet fuel are provided between the inner and outer walls.

The inner wall of the body section 11 comprises a funnel-shaped rearwardly converging entrance or diffuser portion 25, a short rearwardly diverging portion 26 comprising the rear end of the diffuser; and a head-throat 27 intermediate the portions 25 and 26. The fins 21 of the head section are disposed in the entrance portion 25.

The inner wall of the body section 12 comprises a forward portion 29 and a rear portion 30, which together form the forward end of the ram-jet combustion chamber.

The inner wall of the tail section 13 comprises a portion 31 which is a continuation of the portions 29 and 30, a short converging portion 32, a funnel-shaped diverging tail pipe portion 34 extending to the rear end of this section, and a tailpipe throat 35 intermediate the portions 32 and 34.

The inner wall portions 29, 30, and 31 have the shape of a truncated paraboloid of revolution and are designed to provide for maximum operating efficiency of a ducted rocket engine or ram-jet either alone or together. These portions define an ideally isopiestic ram-jet combustion chamber in which are located a plurality of ram-jet fuel injection heads 36 at the wall of the duct.

The rocket engine 20 is mounted in the casing 19 for axial sliding movement whereby the rocket engine may be adjusted with respect to the head-throat 27, to attain desired operating characteristics. For example, the tail piece of the rocket engine may be positioned forwardly of the head-throat 27, as shown in full lines, and may be positioned rearwardly of the head-throat 27, as shown in broken lines by extending the rocket engine rearwardly of its nacelle. This has the effect of varying the effective cross-sectional area of the throat, thereby permitting adjustment of effective ram-jet compression ratio and impoved ram-recovery for optimal operating efficiency throughout a wide range of Mach numbers. The tail piece may be extended or retracted by suitable mechanical or hydraulic mechanism, for example, by jack screws geared to an electric motor in a circuit including switch and timing elements for controlling the motor. The rocket engine 20 may be attached rigidly to the sliding tail piece, as shown in Figure 1, and movable therewith or as an alternate arrangement, the rocket engine may be attached permanently to the structure of the main nacelle 19, and a slidable shell 23 provided for varying the throat area, the rocket engine thus being independent of the motion of this shell.

The fuel and propellant supply system for the missile, which may be characterized as a "ram-rocket," is shown schematically in Figure 2. This system generally comprises tanks for the rocket propellant and tanks for the ram-jet fuel located in the sections 10, 11, 12, and 13, conduit means including pumps for respectively delivering the propellant and fuel to the rocket engine 20 and the ram-jet heads 36, and valves which facilitate separation of the sections without loss of propellant or fuel, provision being made to empty the tanks consecutively from the tail towards the head of the missile by transferring the contents thereof forwardly from one section to another while being consumed. Since the rocket engine may be of the liquid bi-propellant type, the tanks are arranged for storing separate supplies of two types of reactant which are simultaneously delivered to the engine in desired proportions. However, it will be appreciated that the rocket engine could be of the single propellant type or other suitable fluid propellant type and that the propellent system could be modified accordingly without departing from the present invention.

In order to accomplish the foregoing, the section 10 has mounted therein a tank 40A for type A reactant and a tank 40B for type B reactant, the letters A and B suffixed to the tank reference numeral just mentioned and to be used hereinafter, being utilized to designate the type of reactant or propellent component to be stored in the respective tanks. A pair of concentric tanks 41A and 41B, 42A and 42B, and 43A and 43B is respectively mounted in each of the sections 11, 12, and 13, the tanks 43A and 43B being located at the tail end of the section 13 and a ram-jet fuel tank 44 being mounted ahead of the tanks 43A and 43B.

A pair of continuous conduits constructed in sections are provided for conducting the propellant from the aforementioned sets of tanks to the rocket engine combustion chamber. Since these conduits are identical and have identical accessories associated therewith, only one will be described but identical reference numerals will be applied to corresponding elements of the other.

For example, the type A reactant conduit comprises a section 46 extending from the rear of the tank 43A through the tank 44 to the separation point 17; a section 47 connected to the section 46 at 17 and extending through the tank 42A to the separation point 16; a section 48 connected to the section 47 at 16 and extending through the tank 41A to the separation point 15; and a section 50 connected to the section 48 at 15 and extending through the tank 40A to the rocket engine combustion chamber.

The conduit section 46 has an inlet opening 51 at the rear end thereof disposed in the tank 43A and has an auxiliary fuel booster pump 52 connected therein adjacent the separation point 17.

The conduit section 47 includes an inlet opening 54 disposed in the rear end of the tank 42A provided with a normally closed valve 55, a check valve 56 permitting only forward flow of the propellant located adjacent the separation point 17, and an auxiliary or booster pump 57 connected therein adjacent the separation point 16.

The conduit section 48 includes an inlet opening 59, valve 60, a check valve 61 and a booster pump 62 arranged in a similar manner as described in connection with corresponding elements of the section 47.

The conduit section 50 includes an inlet opening 64 disposed in the tank 40A provided with a normally closed valve 65, a check valve 66 adjacent the separation joint 15, and a main propellant pump 67 adjacent the rocket engine combustion chamber.

It will be apparent from the description of the conduit and its accessories to this point, that the propellant can be conducted to the rocket engine from the tanks 43A, 42A, 41A, and 40A in the order named by controlling the various inlet openings of the conduit sections as will be described later.

A continuous conduit constructed in sections is provided for conducting fuel from the tank 44 to ram-jet injection heads 36 located in the missile sections 10, 11, 12, and 13. This conduit comprises a section 70 extending from the rear of the tank 44 to the separation point 17; a section 71 connected to the section 70 at 17 and extending to the separation point 16; a section 72 connected to the section 71 at 16 and extending to the separation point 15; and a section 73 connected to the section 72 at 15 and to the foremost ram-jet head 36.

The fuel conduit sections 70, 71, and 72 have ram-jet heads 36 connected therein and the section 70 in addition includes a control valve 75 and a main fuel pump 76. Fuel-flow or metering systems and/or valving devices, other than the main control valves and check valves already described, are not shown for either the rocket propellant or ram-jet fuel system; however, such devices may be included in such systems to afford improved operating control.

Rocket propellant tanks 40A, 40B, 41A, 41B, 42A, 42B, and ram-jet fuel tank 44 may be pressurized before launching or takeoff of missile by the use of a chemically inert gas under pressure or other suitable pressurizing arrangement in order to assist or supplement the hydraulic operation of the fuel and propellant supply pumps.

At the separation points 15, 16, and 17, means are provided for connecting the missile sections 10, 11, 12, and 13, respectively, to effect disposal of the no longer required sections and the various propellant and fuel conduits associated with these sections. To accomplish this, the missile sections have flanged fittings or lugs at their points of connection, and conduit sections have flanges at their joints of connection held in fluid sealed type relation while the missile sections are connected. Typical means for effecting disconnection and separation of the foregoing elements at points 15, 16, and 17 are illustrated in Figure 3 as being explosive nuts 78 on bolts 79 for securing adjoining ears or flanges which nuts are adapted to be electrically fired upon the closing of circuits associated with control means about to be described. Since such explosive nuts are well known, a detailed description thereof is believed to be unnecessary.

In Figure 4 a wiring diagram is illustrated which includes elements for controlling the pumps, valves, and section separation means, it being understood that additional control elements and circuits are utilized in connection with a missile of this type which, however, are not shown or described because they do not constitute part of the present invention. Such additional elements would normally include combustion ignition controls, guidance controls, controls for the rocket engine extending and retracting means, and warhead equipment. The wiring diagram illustrated is designed for simultaneous rocket engine and ram-jet operation during a portion of the initial or atmospheric stage of the flight of the missile. However, it should be noted that with some modification of this wiring arrangement, it is possible to arrange for separate operation of either rocket engine or ram-jet alone during portions of this same initial stage of flight, if performance requirements indicate the advisability of such an operating sequence.

In the wiring diagram, there is shown a source of direct current such as a battery 80; a main switch 81; a selector switch including a switch arm 82 and contacts 115, 116, 155, 160, 165, and 175; a motor 84 for operating the arm, a timer 85 including switches 86 and 87 for controlling the motor 84 and firing of the explosive nuts 78, respectively, and selector limit switch circuits 89; a relay 90 under the control of the switch 87 for closing the explosive nut firing circuits; the main pumps 67 and the booster pumps 52, 57, and 62 driven by motors under the control of the main switch; the valves 55, 60, and 65 which are operated by solenoids or other suitable electric actuation under the control of the selector switch; the valve 75 and pump 76 under the control of the selector switch; and a slow acting relay 91 for delaying operation of the valve 75. Provision is made at the severance points 15, 16, and 17 to facilitate separation of the conductors in the circuits at these points as these missile sections are disposed of. The circuits embodied in the wiring diagram will be understood from the description of the operation of the apparatus about to follow.

In operation, the missile is launched in any suitable manner, the main switch 81 is closed causing the rocket engine propellant pumps 52, 57, 62, and 67 to deliver propellant from the tail section tanks 43a and 43b to the rocket engine combustion chamber, and ignition means (not shown) are actuated to initiate operation of the rocket engine 20.

After a short interval, or when a predetermined velocity or Mach number of the missile has been attained, the timer 85 effects closing of the switch 86 to connect the motor 84 to the battery 80 whereby the switch arm 82 is moved from the ineffective position to a position to engage the contact 175. This causes energization of the selector limit switch circuit 89a to open the switch 86 and prevent further movement of the switch arm 82 at this time, and closes the circuit for operating the ram-jet fuel pump 76 and the relay 91. The relay 91 through its switch elements closes a circuit for effecting opening of the valve 75 after a sufficient delay to enable the pump 76 to pressurize the ram-jet fuel of tank 44. When the valve 75 is opened, fuel is delivered to the ram-jet head 36 and ram-jet and rocket engine are operated together.

After the foregoing operations have been effected, the timer again acts to close the motor circuit switch 86 to cause the switch arm to be moved into engagement with the contact 155 at about the instant the ram-jet fuel in the tank 44 and the rocket propellant in the tanks 43A and 43B are consumed. The arm 82 through contact 155 causes energization of the selector limit switch circuit 89b to open the switch 86 and prevent further movement of the arm 82 at this time, and closes the circuit for effecting opening of the valves 55 in the propellant tanks 42A and 42B. Simultaneously with, or immediately after, the opening of the valves 55, the timer closes the switch 87 to energize the relay 90 which through its switch elements closes a circuit for firing the explosive nuts 78 at the severance point 17 whereby the tail section 13 is disposed of. The rocket engine thus continues to operate to propel the missile.

At about the time the rocket propellant in the tanks 42A and 42B has been consumed, the timer again acts to close the motor circuit switch 86 whereby the switch arm 82 is moved into engagement with the contacts 116 and 160. This respectively causes the explosive nuts 78 at the severance point 16 to be connected to one terminal of the battery 80 and energization of the selector limit switch circuit 89c to open the switch 86 and prevent further movement of the arm 82 at this time and effects opening of the valves 60 in the tanks 41A and 41B. Simultaneously, or immediately thereafter, the timer again effects closing of the switch 87 to energize the relay 90 which connects the explosive nuts 78 at point 16 to the other terminal of the battery whereby firing of the nuts is effected to dispose of the body section 12.

The rocket engine now is operated by propellant delivered from the tanks 41A and 41B, and, at about the time these tanks are empty, the timer again acts to close the motor circuit switch 86 whereby the switch arm 82 is moved into engagement with the contacts 115 and 165. This respectively causes the explosive nuts 78 at the severance point 15 to be connected to one terminal of the battery 80 and causes energization of the selector limit switch circuit 89d to open the switch 86 and prevent further movement of the arm 82, and effects opening of the valves 65 in the tanks 40A and 40B. Simultaneously, or immediately thereafter, the timer again effects closing of the switch 87 to energize the relay 90 which connects the explosive nuts 78 at point 15 to the other terminal of the battery whereby firing of the nuts is effected to dispose of the body section 11.

The head section 10 of the missile continues in its flight with the rocket engine being operated by propellant delivered from the tanks 40A and 40B. During the last atmospheric part of the flight of head section 10 to the target or destination, the airfoil fin 24 may be utilized to permit high Mach number gliding and aerodynamic control for increased range and accuracy.

From the foregoing description, it will be seen that the present invention provides a novel long range missile which has the combined advantages of a rocket engine and a ram-jet. Disposal of the sections as the fuel and/or propellant tanks are emptied increases the range of flight, and is accomplished in a simple and practical manner.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. In combination, a missile having a pair of sections provided with a duct extending axially therethrough, a rocket engine in one of said sections, a rocket propellent tank in said other section, conduit means for conducting propellant from said tank to said engine, means interconnecting said sections operable to effect separation thereof, and valve means in said conduit means between said tank and said engine operable to close said conduit means upon separation of said sections.

2. In combination, a missile having a pair of sections provided with a duct extending axially therethrough, a rocket engine in one of said sections, rocket propellent tanks in each of said sections, conduit means for conducting propellant from each of said tanks to said engine, means interconnecting said sections operable to effect separation thereof, and valve means in said conduit means between said tanks operable to close said conduit means upon separation of said sections.

3. In combination, a missile having head, body and tail sections provided with a duct extending axially therethrough, a rocket engine in said head section, rocket propellent tanks in said body and tail sections, conduit means for conducting propellant from said tanks to said engine, means interconnecting said sections operable to effect separation of said tail section from said body section and separation of said body section from said head section in the order named, and valve means in said conduit means between said tail tank and said body tank operable to close said conduit means upon separation of said tail section from said body section.

4. In combination, a missile having a pair of sections provided with a duct extending axially therethrough, a rocket engine in one of said sections, rocket propellent tanks in each of said sections, conduit means for conducting propellant from each of said tanks to said engine, means interconnecting said sections operable to effect separation thereof, valve means in said conduit means between said tanks operable to close said conduit means upon separation of said sections, and pump means for effecting transfer of propellant through said conduit means.

5. In combination, a missile having a plurality of sections provided with a duct extending axially therethrough, a rocket engine in one of said sections, rocket propellent tanks in said sections, conduit means between said tanks and said engine, means interconnecting said sections, electrically operable means for rendering said interconnecting means ineffective to cause separation of said sections, electrically operable valve means in said conduit means between said tanks, and an electrical circuit for selectively effecting operation of one of said means for causing said interconnecting means to become ineffective whereby adjoining sections will be separated and for effecting operation of said valve means between separated sections to close said conduit means.

6. In combination, a missile with open ends and imperforate outer body walls having a duct extending axially therethrough, a rocket engine for providing the main driving force of the missile in and adjacent the forward end of said duct, and ram-jet injection heads intermediate said engine and the tail end of said duct for injecting fuel into said duct.

7. In combination, a missile having a duct extending axially therethrough provided with a throat adjacent the forward end and a second throat adjacent the tail end, a rocket engine between the forward end of said duct and said first throat, and ram-jet injection heads intermediate said throats for injecting fuel into said duct.

8. In combination, a missile having a duct extending axially therethrough provided with a throat adjacent the forward end, a second throat adjacent the tail end and an intermediate portion in the form of a truncated paraboloid of revolution, a rocket engine between the forward end of said duct and said first throat, and ram-jet heads in said intermediate portion for injecting fuel into said duct.

9. In combination, a missile having a duct extending axially therethrough provided with a throat adjacent the forward end, a second throat adjacent the tail end and an intermediate portion in the form of a truncated paraboloid of revolution, a rocket engine between the forward end of said duct and said first throat, and ramjet heads in said intermediate portion for injecting fuel into said duct, said duct having an outwardly flared portion between said forward end and said first throat and having an outwardly flared portion between said tail end and said second throat.

10. In combination, a missile having a duct extending axially therethrough provided with a throat adjacent the forward end and a second throat adjacent the tail end, a rocket engine between the forward end of said duct and said first throat, and ram-jet heads intermediate said throats for injecting fuel into said duct, said missile comprising a plurality of sections connected lengthwise between said throats and adjacent said first throat, and means for effecting disconnection of said sections.

11. In combination, a missile having a duct extending axially therethrough provided with a throat adjacent the forward end, a second throat adjacent the tail end and an intermediate portion in the form of a truncated paraboloid of revolution, a rocket engine between the forward end of said duct and said first throat, and ram-jet heads in said intermediate portion for injecting fuel into said duct, said missile comprising a plurality of sections connected lengthwise between said throats and adjacent said first throat, and means for effecting disconnection of said sections.

12. In combination, a missile having a duct extending axially therethrough provided with a throat adjacent the forward end, a second throat adjacent the tail end and an intermediate portion in the form of a truncated paraboloid of revolution, a rocket engine between the forward end of said duct and said first throat, and ram-jet heads in said intermediate portion for injecting fuel into said duct, said duct having an outwardly flared portion between said forward end and said first throat and having an outwardly flared portion between said tail end and said second throat, said missile comprising a plurality of sections connected lengthwise substantially at the middle of said intermediate duct portion and rearwardly adjacent said first throat, and means for effecting disconnection of said sections.

13. In combination, a missile having a duct extending axially therethrough provided with a throat adjacent the forward end and a second throat adjacent the tail end, a rocket engine between the forward end of said duct and said first throat, and ram-jet heads intermediate said throats for injecting fuel into said duct, said missile comprising a plurality of sections connected lengthwise between said throats, between said forward end and said first throat and rearwardly adjacent said first throat, and means for effecting disconnection of said sections.

14. In combination, a missile comprising a forward section, a tail section and an intermediate body section, said sections being interconnected lengthwise and having a duct extending axially therethrough; means for effecting disconnection of said sections; a rocket engine in said forward section; ram-jet injection heads in said body section; a tank for rocket propellant in said body section; a tank for ram-jet fuel in said tail section; conduit means for conducting rocket propellant from its tank to said engine; and conduit means for conducting fuel from its tank to said ram-jet heads 15. In combination, a missile comprising a forward section, a tail section and an intermediate body section, said sections being interconnected lengthwise and having a duct extending axially therethrough; means for effecting disconnection of said sections; a rocket engine in said forward section; ram-jet injection heads in said body section; a tank for rocket propellant in said body section; a second tank for rocket propellant in said tail section; a tank for ram-jet fuel in said tail section; conduit means for conducting rocket propellant from its tanks to said engine; a valve in said conduit means between said tail section and said body section for effecting closing of said conduit means upon separation of these sections; and conduit means for conducting fuel from its tank to said ram-jet heads.

16. A missile in accordance with claim 15 wherein a pump is in said rocket propellant conduit means between said tail section tank and said valve.

17. In combination, a missile comprising a forward section, a tail section, and an intermediate body section, said sections being interconnected lengthwise and having a duct extending axially therethrough; means for effecting disconnection of said sections; a rocket engine in said forward section; ram-jet heads in said body section; a tank for rocket propellant in said body section; a second tank for rocket propellant in said tail section; a third tank for rocket propellant in said forward section; a tank for ram-jet fuel in said tail section; conduit means for conducting rocket propellant from its tanks to said engine; a valve in said conduit means between said tail section and said body section and a second valve in said conduit means between said body section and said forward section for effecting closing of said conduit means upon separation of these sections; and conduit means for conducting fuel from its tank to said ram-jet heads.

18. A missile in accordance with claim 17 wherein a pump is in said rocket propellant conduit means between said tail section tank and said first valve, and a second pump is in said rocket propellant conduit means between said body section tank and said second valve.

19. A missile in accordance with claim 17 wherein a pump is in said rocket propellant conduit means between said tail section tank and said first valve, a second pump is in said rocket propellant conduit means between said body section tank and said second valve, and a pump is in said fuel conduit means between said fuel tank and said ram-jet heads.

20. In combination, a missile having an axial duct, a rocket engine in and adjacent the forward end of said duct, a tank for rocket propellant, a second tank for rocket propellant positioned rearwardly of said first tank, conduit means serially interconnecting said tanks for conducting propellant respectively from said second and first tanks to said engine, and a valve in said conduit means operable to prevent the flow of propellant from said first tank towards said second tank.

21. In combination, a missile, a forward section, a tail section, and an intermediate body section, said sections being interconnected lengthwise and having an axial duct, means for effecting disconnection of said sections; a rocket engine in said forward section; a tank for rocket propellant in said forward section, a tank for rocket propellant in said body section, a tank for rocket propellant in said tail section, a conduit interconnecting said tail tank and said body tank, a valve in said conduit operable to prevent flow from said body tank to said tail tank upon separation of said tail tank from said body tank, a second conduit connecting said body tank and said forward tank, a valve in said second conduit operable to prevent flow from said forward tank to said body tank upon separation of said body tank from said forward tank, and a conduit for connecting said forward tank to said engine.

22. In combination, a missile, a forward section, a tail section, and an intermediate body section, said sections being interconnected lengthwise and having an axial duct, means for effecting disconnection of said sections; a rocket engine in said forward section; a tank for rocket propellant in said forward section, a tank for rocket propellant in said body section, a tank for rocket propellant in said tail section, a conduit interconnecting said tail tank and said body tank, a valve in said conduit operable to prevent flow from said body tank to said tail tank upon separation of said tail tank from said body tank, a pump in said conduit between said valve and said tail tank, a second conduit interconnecting said body tank and said forward tank, a valve in said second conduit operable to prevent flow from said forward tank to said body tank upon separation of said body tank from said forward tank, a pump in said second conduit between said last valve and said body tank, a conduit for connecting said forward tank to said engine, and a pump in said conduit between said forward tank and said engine.

23. In combination, a missile, a forward section, a tail section, and an intermediate body section, said sections being interconnected lengthwise and having an axial duct, means for effecting disconnection of said sections; a rocket engine in said forward section; a tank for rocket propellant in said forward section, a tank for rocket propellant in said body section, a tank for rocket propellant in said tail section, a conduit interconnecting said tail tank and said body tank, a valve in said conduit operable to prevent flow from said body tank to said tail tank upon separation of said tail tank from said body tank, a second conduit interconnecting said body tank and said forward tank, a valve in said second conduit operable to prevent flow from said forward tank to said body tank upon separation of said body tank from said forward tank, a conduit for connecting said forward tank to said engine, and means including a timing element for controlling the operation of said valves and said section disconnection effecting means.

24. In combination, a missile, a forward section, a tail section and an intermediate body section, said sections being interconnected lengthwise and having an axial duct, means for effecting disconnection of said sections; a rocket engine in said forward section; a tank for rocket propellant in said forward section, a tank for rocket propellant in said body section, a tank for rocket propellant in said tail section, a conduit connecting said tail tank and said body tank, a valve in said conduit operable to prevent flow from said body tank to said tail tank upon separation of said tail tank from said body tank, a pump in said conduit between said valve and said tail tank, a second conduit interconnecting said body tank and said forward tank, a valve in said second conduit operable to prevent flow from said forward tank to said body tank upon separation of said body tank from said forward tank, a pump in said second conduit between said last valve and said body tank, a conduit for connecting said forward tank to said engine, a pump in said conduit between said forward tank and said engine, and means including a timing element for controlling the operation of said valves, pumps and section disconnection effecting means.

25. In combination, a missile having a duct extending axially therethrough formed with a ram-jet combustion chamber in its entirety in the shape of a truncated paraboloid of revolution, a rocket engine in said duct positioned forwardly of said chamber, ram-jet fuel injection heads in said chamber, means for supplying fuel to said heads, and means for supplying rocket propellant to said engine.

References Cited in the file of this patent

UNITED STATES PATENTS

| Number | Name | Date |
|---|---|---|
| 2,419,866 | Wilson | Apr. 29, 1947 |
| 2,531,761 | Zucrow | Nov. 28, 1950 |

FOREIGN PATENTS

| Number | Country | Date |
|---|---|---|
| 522,163 | France | Mar. 22, 1921 |
| 625,104 | France | Apr. 19, 1927 |
| 618,668 | Germany | Sept. 13, 1935 |
| 798,489 | France | Mar. 10, 1936 |
| 637,043 | Germany | Oct. 19, 1936 |
| 866,598 | France | May 26, 1941 |

OTHER REFERENCES

"Jet Thrust Augmented," p. 220, Scientific American, November, 1947, published by Munn and Co., 24 W. 40th Street, New York 18, New York.